United States Patent Office 3,111,535
Patented Nov. 19, 1963

3,111,535
METHOD OF COPOLYMERIZATION
Siegfried Nitzsche and Ewald Pirson, Burghausen, Bavaria, Germany, assignors to Wacker-Chemie G.m.b.H., Bavaria, Germany
No Drawing. Filed Mar. 15, 1961, Ser. No. 95,789
Claims priority, application Germany Mar. 23, 1960
5 Claims. (Cl. 260—448.8)

This invention relates to a method of preparing reaction products of organopolysiloxanes and polyglycols.

The use of copolymers of silicones and polyglycols as surface active materials has been suggested. Such copolymers have been proposed as wetting agents and as emulsifying agents. The copolymers have been prepared by reacting an alkoxy silane or alkoxylated siloxane with the polyglycol. The condensation reaction occurred with elimination of an alcohol but the resulting condensation products were extremely sensitive to hydrolysis hence their use has been limited.

Another method for preparing silicone-polyglycol copolymers comprises reacting a cyclic diorganosiloxane with a polyglycol employing an alkali metal hydroxide as catalyst. The products obtained must be neutralized after the reaction and this presents difficulties because the addition of aqueous acids results in hydrolysis of the product regenerating the diorganosiloxane and polyglycol.

It is the object of this invention to introduce a novel method for preparing copolyers of siloxanes and polyglycols. Other objects and advantages of this invention are detailed in or will be apparent from this disclosure and the appended claims.

This invention comprises reacting an organosiloxane polymer free of hydrocarbonoxy groups with a polyglycol at an elevated temperature. This reaction may be illustrated by the equations:

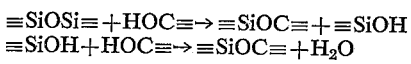

The siloxanes employed herein are homopolymers and copolymers of the general unit formula

where each R is a monovalent hydrocarbon radical and $n$ has a value of 1.0 to 3.0. Included are straight chain polyemrs as well as branched chain and cross-linked polymers. Thus siloxane fluids and resins can be employed herein. The operable siloxanes can contain hydroxyl groups on up to 8% of the silicon atoms present. The radicals represented by R can be alkyl radicals such as methyl, ethyl, propyl, butyl and octadecyl, aryl radicals such as phenyl, diphenyl and anthracyl, alkaryl such as tolyl, xylyl, ethylphenyl and methylnaphthyl, aralkyl such as benzyl and phenylethyl, cycloaliphatic such as cyclohexyl and cyclopentyl and alkenyl such as vinyl, allyl and octadecenyl. Preferred embodiments are those wherein R is alkyl of 1–5 carbons and/or phenyl. A unique reaction can be carried forward according to this invention employing fully condensed siloxane polymers such as $R_3SiO[R_2SiO]_xSiR_3$ where $x$ is an integer.

The polyglycol reactants employed herein are preferably derived from ethylene glycol and/or propylene glycol and have an average molecular weight of at least 150. Thus operable polyglycols include those of the formulae $HO(C_2H_4O)_nH$, $HO(C_3H_6O)_nH$ and $$HO(C_2H_4O)_n(C_3H_6O)_nH$$

The ratio of organosiloxane polymer to polyglycol in the reaction mass can vary from 1/1 to 1/15 on a weight basis. The reactants are merely mixed in the desired ratio and heated to secure the desired reaction.

The method of this invention has several distinct advantages. The reaction is carried out in simple equipment and over a very short period of time. The reaction products are obtained in usable form and do not require purifying or neutralization. The products are generally water soluble and are much more resistant to hydrolysis than are similar compounds prepared from monosilanes. The products exhibit great surface activity and are particularly useful as wetting agents, foaming agents, emulsifying agents and suspending agents. These products can also be employed to apply silicones in water solution to a surface.

The reaction occurs by simply heating the mixture of reactants with concurrent stirring. Generally temperatures of 160° C. are employed and it is preferred to carry out the reaction at 150° to 300° C. A common organic solvent such as xylene, benzene, benzine and various hydrocarbon cuts from petroleum (e.g. paraffin oils), can be employed to secure more rapid reaction rates. The solvent is distilled off during reaction. Catalysts such as metal powders (e.g. magnesium powder, copper powder, aluminum powder and zinc powder) can be employed to accelerate the reaction. Such catalysts are easily removed from the reaction product by filtering.

The following examples are included herein to aid those skilled in the art to understand and practice this invention. All parts and percentages are based on weight unless otherwise specified.

*Example 1*

A mixture was prepared by adding with stirring 200 g. of a copolymer of 60 mol % monophenylsiloxane units and 40 mol % dimethylsiloxane units and having hydroxyl groups on about 2% of the silicon atoms to 600 g. of polyethylene glycol (molecular weight about 300). The siloxane and polyglycol were not miscible at room temperature. The mass was heated to 270° C. with stirring within 20 minutes. The mass became homogeneous. It was heated at 270° C. for 10 minutes and then cooled. A clear, water soluble reaction product was obtained. The reaction product was dissolved in water (0.25 g. per 100 grams water). The resulting solution was exceedingly foamy and could be easily foamed even after standing for 14 days.

*Example 2*

A mixture of 4 parts of a copolymeric ethylene-propylene polyglycol (molecular weight 400) and 1 part of phenylmethylsiloxane oil (viscosity 200 cs. at 25° C.) was heated with stirring to 260° C. in the presence of 0.5% zinc dust (based on total reactants). The phenylmethylsiloxane oil was a copolymer of 75 mol percent 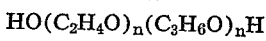 units and 25 mol percent of $(CH_3)_2SiO$ units and was fully endblocked with $(CH_3)_3SiO_{1/2}$ units hence had no functional substituents. The reactants were heated to 260° C. within 25 minutes and held at that temperature for an additional 25 minutes. The mass was cooled and the zinc powder removed by filtering. The product was a homogeneous light brown oil which was very soluble in water to produce a clear solution which displays strong foaming properties.

*Example 3*

A mixture of 8 parts of a copolymeric ethylene-propylene polyglycol (molecular weight 1000) and 1 part of diphenylethylsiloxane $[(C_6H_5CH_2CH_2)_2SiO]$ were mixed and heated to and at 270° C. as in Example 1, in the presence of 0.75% copper powder based on the reactants. The reaction product was separated from the copper powder by filtering. The reaction product dissolved readily in water to give a slightly turbid solution. The solution was an excellent foaming agent and emulsifier.

Example 4

A siloxane copolymer of vinylmethylsiloxane units, monophenylsiloxane units and dimethylsiloxane units in a ratio of 1/2/4 was heated to 220° C. over a period of six minutes in mixture with six times as much polypropyleneglycol (average molecular weight 200), in the presence of .3% magnesium powder. The reaction product becomes very frothy in water solution.

That which is claimed is:

1. The method consisting essentially of cocondensing at least one organopolysiloxane of the unit formula $$R_nSiO_{\frac{4-n}{2}}$$

wherein R is a monovalent hydrocarbon radical and $n$ has an average value of from 1.0 to 3.0 with at least one polyglycol selected from the group consisting of $$HO[C_2H_4O]_xH$$

$HO[C_3H_6O]_xH$ and $HO[C_2H_4O]_x[C_3H_6O]_xH$ where $x$ has a value such that the average molecular weight of the glycol is at least 150, employing a reaction temperature of 150°–300° C. and a catalyst selected from the group consisting of magnesium, copper, aluminum and zinc.

2. The method of claim 1 wherein the organopolysiloxane is a fully condensed linear triorganosilyl end-blocked diorganosiloxane polymer.

3. The method of claim 1 further characterized in that the weight ratio of organopolysiloxane:polyglycol is from 1:1 to 1:15 inclusive.

4. The method of claim 1 further characterized in that the reaction is carried forward in the presence of an organic solvent.

5. The method of claim 1 further characterized in that the organopolysiloxane reactant contains hydroxyl groups bonded to up to 8 percent of the silicon atoms present.

References Cited in the file of this patent

UNITED STATES PATENTS 2,746,982    Hyde _____ May 22, 1956
2,990,377    May _____ June 27, 1961

OTHER REFERENCES

Voronkov: "Izvest. Akad. Nauk, SSSR," 1957, p. 882 (52 Chem. Abstracts 2801 (1958)).